(12) United States Patent
Son et al.

(10) Patent No.: US 10,513,199 B2
(45) Date of Patent: Dec. 24, 2019

(54) VOLTAGE DROP COMPENSATION CONTROL SYSTEM AND METHOD OF POWER SUPPLY DEVICE

(71) Applicants: Hyundai Motor Company, Seoul (KR); Kia Motors Corporation, Seoul (KR)

(72) Inventors: Gi Bong Son, Gyeonggi-do (KR); Ho Joong Lee, Gyeonggi-do (KR); Dong Gyun Woo, Gyeonggi-do (KR); Won Kyoung Choi, Gyeonggi-do (KR); Hyun Wook Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 141 days.

(21) Appl. No.: 15/831,125

(22) Filed: Dec. 4, 2017

(65) Prior Publication Data

US 2019/0084437 A1 Mar. 21, 2019

(30) Foreign Application Priority Data

Sep. 18, 2017 (KR) .................. 10-2017-0119676

(51) Int. Cl.
*B60L 58/10* (2019.01)
*H02M 3/04* (2006.01)

(52) U.S. Cl.
CPC ............... *B60L 58/10* (2019.02); *H02M 3/04* (2013.01); *B60L 2210/10* (2013.01)

(58) Field of Classification Search
CPC ...... B60L 58/10; B60L 50/00; B60L 2210/10; G05F 1/00; H02M 3/04
See application file for complete search history.

(56) References Cited

U.S. PATENT DOCUMENTS 5,355,075 A * 10/1994 Wilson, III ............. H02J 9/066
322/25

FOREIGN PATENT DOCUMENTS

KR 100471236 B1 3/2005

* cited by examiner

*Primary Examiner* — Robert L Deberadinis
(74) *Attorney, Agent, or Firm* — Mintz Levin Cohn Ferris Glovsky and Popeo, P.C.; Peter F. Corless

(57) ABSTRACT

A voltage drop compensation control system and method of a power supply device are provided. The voltage drop compensation control system of the power supply device, for compensating for a voltage drop generated in an electric connection line between a direct current (DC)-DC converter and a battery includes a controller that generates a compensation voltage command that is obtained by compensating for an output voltage command of the DC-DC converter by applying a first control value for compensating for the voltage drop to the output voltage command. The controller also determines the first control value, based on an error between the compensation voltage command or an output voltage detection value of the DC-DC converter and a voltage of the battery.

13 Claims, 4 Drawing Sheets

VOLTAGE DROP COMPENSATION CONTROL SYSTEM AND METHOD OF POWER SUPPLY DEVICE

CROSS-REFERENCE TO RELATED APPLICATION

This application claims the priority benefit of Korean Patent Application No. 10-2017-0119676, filed on Sep. 18, 2017 the disclosure of which is incorporated herein by reference.

BACKGROUND

1. Field of the Disclosure

The present disclosure relates to a voltage drop compensation control system and method of a power supply device, and more particularly, to a voltage drop compensation control system and method of a power supply device, capable of compensating for a voltage drop generated between a direct current (DC)-DC converter and a battery by proportionally adjusting an error of an output voltage of the DC-DC converter and a voltage of the battery.

2. Description of the Related Art

Generally, an output voltage of a DC-DC converter refers to a voltage at which a battery is capable of operating in an optimized condition. Since a line resistance component is disposed between the DC-DC converter and the battery a voltage drop occurs. In particular, a voltage less than an optimal voltage at which the battery operates is applied to a battery terminal. Therefore, the DC-DC converter outputs a voltage having a reflected voltage drop compensation to enable the battery to optimally operate. However, when the DC-DC converter generates a voltage for compensating for a voltage drop, and de-rating a current limit of the battery or an output current limit of the DC-DC converter occurs, the DC-DC converter does not normally output a voltage that reflects the voltage drop compensation.

The matters disclosed in this section are merely for enhancement of understanding of the background of the disclosure and should not be taken as an acknowledgment or any form of suggestion that the matters form the related art already known to a person skilled in the art.

SUMMARY

A voltage drop compensation control system and method of a power supply device is provided. The voltage drop compensation control system and method cause a DC-DC converter to output a voltage to enable a battery to operate in an optimal state through voltage drop compensation and output a voltage in which voltage drop compensation is normally (e.g., within the expected operating conditions) reflected when de-rating including a current limit of the battery and an output current limit of the DC-DC converter occurs.

In an aspect of an exemplary embodiment of the present disclosure, a voltage drop compensation control system of a power supply device, for compensating for a voltage drop generated in an electric connection line between a direct current (DC)-DC converter and a battery may include a controller configured to generate a compensation voltage command, obtained by compensating for an output voltage command of the DC-DC converter by applying a first control value for compensating for the voltage drop to the output voltage command. The controller may be configured to determine the first control value based on an error between the compensation voltage command or an output voltage detection value of the DC-DC converter and a voltage of the battery.

In some exemplary embodiments, the controller may be configured to generate the compensation voltage command obtained by compensating for the output voltage command by applying a second value for vehicle de-rating to the first control value for compensating for the voltage drop. In particular, the second control value may be determined based on a current limit of the battery or an output current limit of the DC-DC converter.

Additionally, the controller may include a voltage command determiner configured to determine the output voltage command based on a driving condition of a vehicle. The controller may include a proportional controller configured to proportionally adjust an error between the compensation voltage command or the output voltage detection value of the DC-DC converter and the voltage of the battery, and a low-pass filter configured to determine the first control value by filtering an output of the proportional controller. Additionally, a proportional gain of the proportional controller may be about 1. The low-pass filter may be configured to determine a band having a response of voltage drop compensation based on the first control value that is less than variation of the voltage of the battery.

In accordance with another aspect of an exemplary embodiment of the present disclosure, a voltage drop compensation control method of a power supply device, for compensating for a voltage drop generated in an electric connection line between a direct current (DC)-DC converter and a battery, may include determining, by a controller, an output voltage command of the DC-DC converter and receiving a voltage of the battery, determining, by the controller, a first control value for compensating for the voltage drop, based on a compensation voltage command which is fed back or an output voltage detection value of the DC-DC converter, and a voltage of the battery, and generating, by the controller, the compensation voltage command by applying the first control value to the output voltage command.

The voltage drop compensation control method may further include determining, by the controller, a second control value for vehicle de-rating, before the generating the compensation voltage command. In particular, the determining, by the controller, the second control value may include determining the second control value based on a current limit of the battery or an output current limit of the DC-DC converter. Additionally, generating, by the controller, the compensation voltage command may include generating the compensation voltage command by applying the second control value to a value obtained by applying the first control value to the output voltage command.

In other exemplary embodiments, the determining the first control value may include performing proportional adjustment by applying a proportional gain to an error between the compensation voltage command or the output voltage detection value of the DC-DC converter and the voltage of the battery, and performing, by the controller, filtering for determining the first control value by low-pass filtering a value obtained by applying the proportional gain to the error. Additionally, the proportional gain may be about 1. The performing the filtering may include applying, by the controller, low-pass filtering for determining a band having a response of voltage drop compensation based on the first control value is less than variation of the voltage of the battery.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
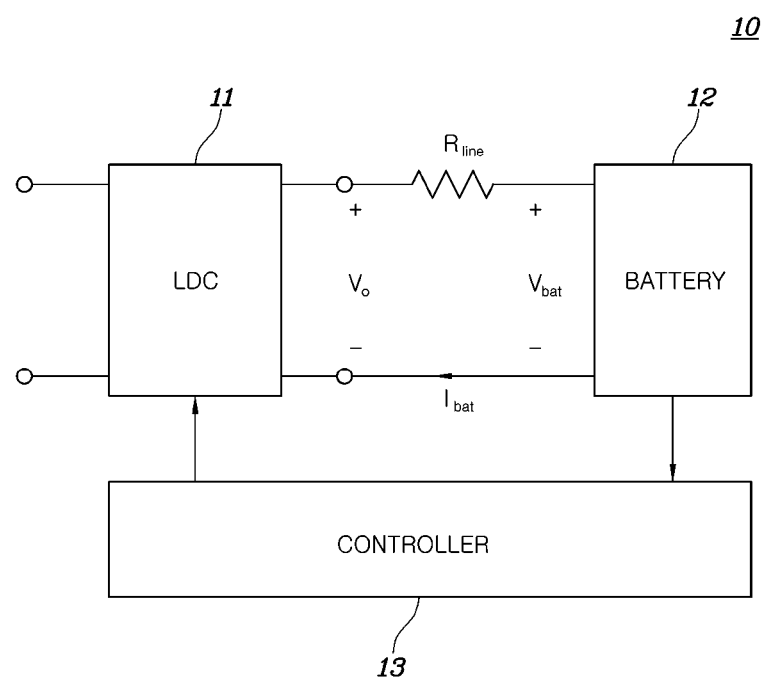
FIG. 1 is an exemplary circuit diagram of a voltage drop compensation control system of a power supply device according to an exemplary embodiment of the present disclosure.

While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Reference will now be made in detail to the exemplary embodiments of the present disclosure, examples of which are illustrated in the accompanying drawings. Wherever possible, the same reference numbers will be used throughout the drawings to refer to the same or like parts.

A voltage drop compensation control system and method of a power supply device according to exemplary embodiments of the present disclosure will now be described with reference to the attached drawings. FIG. 1 is an exemplary circuit diagram of a voltage drop compensation control system of a power supply device according to an exemplary embodiment of the present disclosure. Referring to FIG. 1, a voltage drop compensation control system 10 may include a DC-DC converter 11, a battery 12, and a controller 13.

The DC-DC converter 11 may be a low voltage DC-DC converter (LDC) configured to convert an input voltage and output the converted voltage. For example, the DC-DC converter 11 may be disposed between a high-voltage battery (not illustrated) and the battery 12, (e.g., a low-voltage battery). The DC-DC converter may be configured to convert a level of a DC voltage input from the high-voltage battery and provide the level-converted voltage to the battery 12. The battery 12 connected to the DC-DC converter 11 may be charged by receiving a DC power voltage from the DC-DC converter 12.

As illustrated in FIG. 1, the DC-DC converter 11 and the battery 12 may be connected by a connection such as a cable, or the like. In particular, the cable may have resistance $R_{line}$. Due to the cable resistance $R_{line}$, a voltage that drop corresponds to resistance $R_{line}*$ battery current $I_{bat}$ occurs between the DC-DC converter 11 and the battery 12, therefore a voltage less than an output voltage of the DC-DC converter 11 may be applied to both terminals of the battery 12. In consideration of the above problems, the present disclosure provides a method for more efficiently compensating for a voltage drop between the DC-DC converter 11 and the battery 12, using the controller 13.

The controller 13 may be configured to generate a compensation voltage command $V_O*$, which is obtained by compensating for an output voltage command $V_{vrv}*$ of the DC-DC converter 11, by applying a first control voltage $V_{C1}$ for compensating for a voltage drop and second control values $V_{C21}$ and $V_{C22}$ for vehicle de-rating to the output voltage command $V_{vrv}*$ of the DC-DC converter 11. More specifically, the controller 13 may be configured to determine the first control value $V_{C1}$ based on an error between the compensation voltage command $V_O*$ or output voltage detection value VO of the DC-DC converter 11 and a voltage $V_{bat}$ of the battery 12. The first control value $V_{C1}$ may be reflected in the output voltage command $V_{vrv}*$ of the DC-DC converter 11.

The controller 13 may be configured to determine the second control voltages $V_{C21}$ and $V_{C22}$ for vehicle de-rating with respect to a preset current limit of the battery 12 and/or an output current limit of the DC-DC converter 11. The second control voltages $V_{C21}$ and $V_{C22}$ may be applied when current of the battery 12 and/or current of the DC-DC converter 11 is limited during vehicle de-rating. The controller 13 may be configured to generate the compensation voltage command $V_O{}^*$ by applying the first and second control values $V_{C21}$ and $V_{C22}$ to the output voltage command $V_{vrv}{}^*$ of the DC-DC converter 11.

Figure 2:
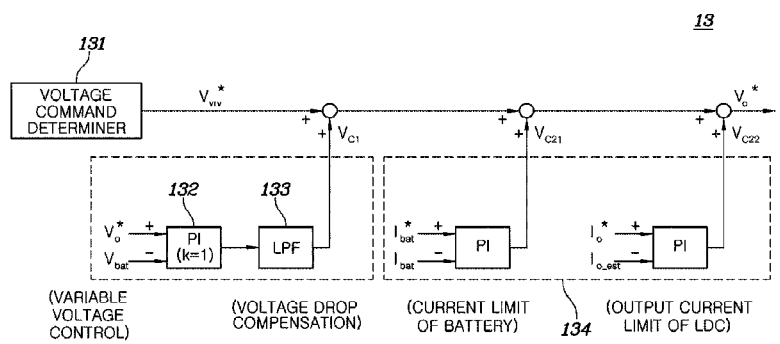
FIG. 2 is an exemplary block diagram of a controller of a voltage drop compensation control system of a power supply device according to an exemplary embodiment of the present disclosure.
Figure 3:
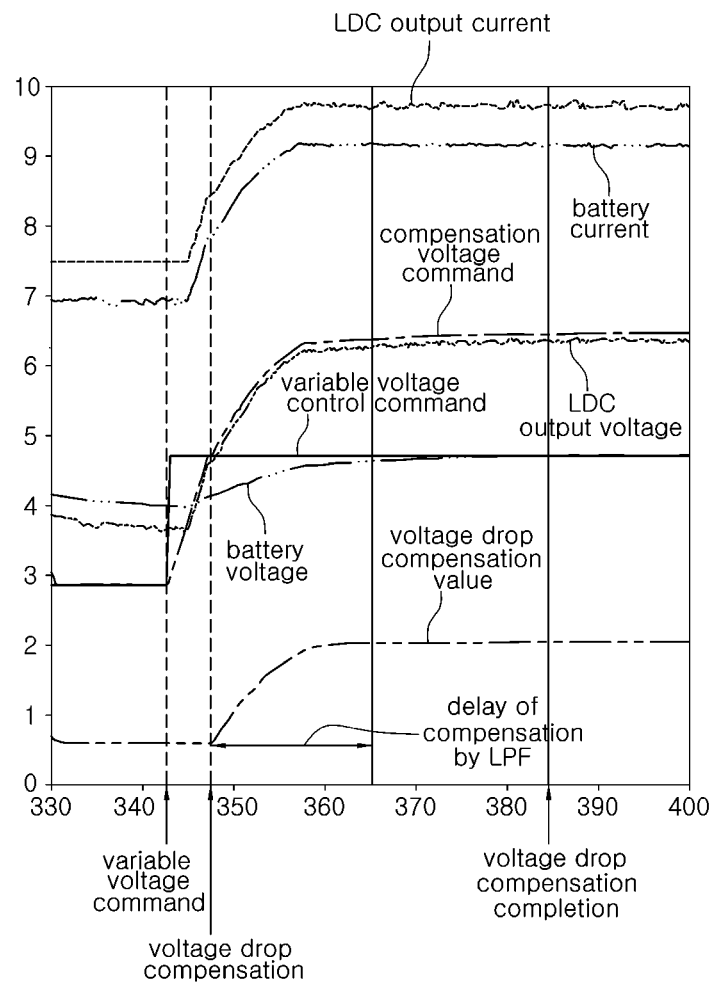
FIG. 3 is an exemplary graph illustrating voltage, current, a voltage command, a current command, a voltage drop compensation value, and a compensation voltage command, which are output from a voltage drop compensation control system of a power supply device according to an exemplary embodiment of the present disclosure.

A detailed configuration of the controller 13 is illustrated in FIG. 2. FIG. 2 is an exemplary block diagram of a controller used in a voltage drop compensation control system of a power supply device according to an exemplary embodiment of the present disclosure. FIG. 3 is an exemplary graph illustrating voltage, current, a voltage command, a current command, a voltage drop compensation value, and a compensation voltage command, which are output from a voltage drop compensation control system of a power supply device according to an exemplary embodiment of the present disclosure.

Referring to FIG. 2, the controller 13 may include a voltage command determiner 131, a proportional integral (PI) controller 132, a low-pass filter (LPF) 133, and a de-rating controller 134. The voltage command determiner 131 may be configured to determine an output voltage command of the DC-DC converter 11 based on driving conditions of a vehicle. The driving conditions of a vehicle refer to various driving conditions which may include an operating state of a main relay, the amount of cooling water, variable voltage control according to an intelligent battery sensor state, and the like.

The PI controller 132 may be configured to proportionally adjust an error between a compensation voltage command $V_O{}^*$ or an output voltage detection value $V_O$ of the DC-DC converter 11 and a voltage $V_{bat}$ of the battery 12. In other words, the PI controller 132 may be configured to receive the compensation voltage command $V_O{}^*$ or the output voltage detection value $V_O$ of the DC-DC converter 11, and the voltage $V_{bat}$ of the battery 12 and calculate an error of the received values. The PI controller 132 may be configured to perform proportional control by applying a proportional gain to the error. In particular, the error calculated by the PI controller 132 may be a value corresponding to a voltage drop that occurs due to resistance $R_{line}$ between the DC-DC converter 11 and the battery 12.

When the PI controller 132 applies proportional control to the error between the compensation voltage command $V_O{}^*$ or the output voltage detection value $V_O$ of the DC-DC converter 11 and the voltage $V_{bat}$ of the battery 12, the magnitude of the proportional gain may be about 1. The compensation voltage command $V_O{}^*$, which has been described as being input to the PI controller 132, may be a command value used to adjust an output of the DC-DC converter 11 by reflecting a first control value $V_{C1}$ and second control values $V_{C21}$ and $V_{C22}$ in an output voltage command $V_{vrv}{}^*$ and will be described in further detail below.

The LPF 133 may be configured to filter an output of the PI controller 132 to determine the first control value $V_{C1}$. The first control value $V_{C1}$ may be a value for compensating for a voltage drop between the DC-DC converter 11 and the battery 12 and represents a voltage drop compensation value illustrated in FIG. 3. In particular, a band of the LPF 133 may be determined to include a response of voltage drop compensation based on the first control value $V_{C1}$ less than variation of the voltage of the battery 12.

Generally, a voltage increase slope of the battery 12 may be adjusted to be less than an output voltage increase slope of the DC-DC converter 11 due to characteristics of the battery 12. Therefore, when the output voltage of the DC-DC converter 11 is instantaneously changed, an error of two input values (e.g., an error between the compensation voltage command $V_O{}^*$ or the output voltage detection value $V_O$ of the DC-DC converter 11 and the voltage $V_{bat}$ of the battery 12) may be increased. Accordingly, excessive voltage drop compensation may be performed. To prevent this phenomenon, the controller 13 may be configured to select the band of the LPF 133 to enable a response of voltage drop compensation to be less than the voltage increase slope of the battery 12. In particular, the band of the LPF 133 may refer to a duration when the voltage drop compensation is delayed by the LPF 133 as illustrated in FIG. 3.

The de-rating controller 134 may be configured to determine the second control values $V_{C21}$ and $V_{C22}$ for vehicle de-rating. For example, when de-rating such as a current limit of the battery 12 or an output current limit of the DC-DC converter 11 occurs, the controller 13 may have difficulty generating the compensation voltage command $V_O{}^*$ in which voltage drop compensation is normally reflected. In other words, when de-rating occurs, the compensation voltage command $V_O{}^*$ may be less than the output voltage command $V_{vrv}{}^*$ of the DC-DC converter 11, the output voltage detection value $V_O$ of the DC-DC converter 11 may be reduced, the voltage $V_{bat}$ of the battery 12 may be reduced, and an error of the two values input to the PI controller 132 may be increased. Accordingly, a voltage drop value may be increased and the control values determined by de-rating may be reset. The de-rating performance and a de-rating response may deteriorate.

The de-rating controller 134 may include a plurality of PI controllers. The de-rating controller 134 may be configured to receive a current command $I_{bat}{}^*$ of the battery 12 and a current $I_{bat}$ of the battery 12 and output the second control value $V_{C21}$ capable of reducing an error of the two input values by applying PI control to the error. In addition, the de-rating controller 134 may be configured to receive a current command $I_o{}^*$ of the DC-DC converter 11 and an output current detection value $I_o$ of the DC-DC converter 11 and output the second control value $V_{C22}$ capable of reducing an error of the two input values by applying PI control to the error. For example, the compensation voltage command $V_O{}^*$ may be reduced due to the second control values $V_{C21}$ and $V_{C22}$, the output voltage detection value $V_O$ of the DC-DC converter 11 may be reduced, the voltage $V_{bat}$ of the battery 12 may be reduced, an error of the two values input to the PI controller 132 may be maintained, thereby improving a de-rating response relative to a conventional scheme.

In particular the de-rating controller 134 may be configured to improve a de-rating response in comparison with a conventional control scheme when de-rating such as a current limit of the battery 12 or an output current limit of the DC-DC converter 11 occurs. Therefore, although load may abruptly vary or a mode may be abruptly adjusted, the number of fault occurrences and the possibility of fault caused by excessive current of the DC-DC converter may be reduced. Accordingly, the durability of the DC-DC converter may be improved and the marketability of a product may be improved. The controller 13 may be configured to generate the compensation voltage command $V_O{}^*$ by adding the output voltage command $V_{vrv}{}^*$ determined by the voltage command determiner 131, the first control value $V_{C1}$ determined by the PI controller 132, and the second control values $V_{C21}$ and $V_{C22}$ determined by the de-rating controller 134.

Figure 4:
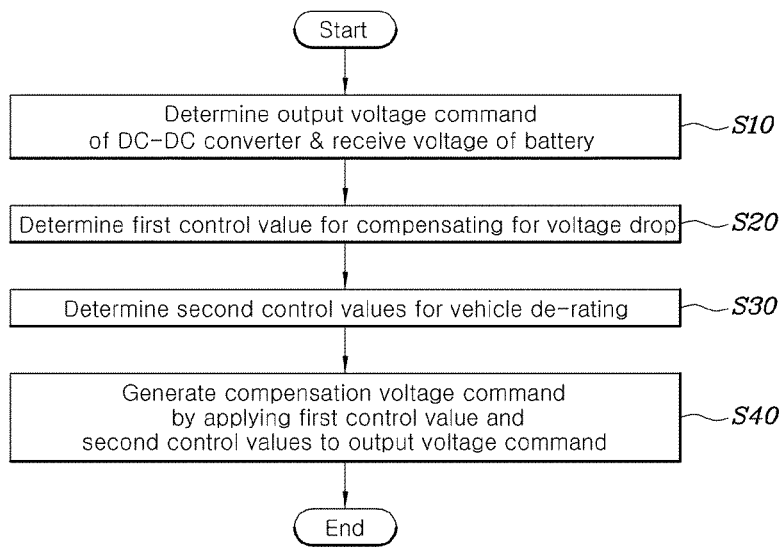
FIG. 4 is an exemplary flowchart illustrating a voltage drop compensation control method of a power supply device according to an exemplary embodiment of the present disclosure.

FIG. 4 is an exemplary flowchart illustrating a voltage drop compensation control method of a power supply device according to an exemplary embodiment of the present disclosure. The voltage drop compensation control method according to an exemplary embodiment of the present disclosure may be performed by the controller 16 of the voltage drop compensation control system 10 according to the above-described exemplary embodiment of the present disclosure and has been described in detail with reference to FIGS. 1 to 3. Therefore, the voltage drop compensation control method will be briefly described below with reference to FIG. 4 and a detailed operation or example thereof is replaced with the above description.

First, the controller 13 may be configured to determine an output voltage command $V_{vrv}*$ of the DC-DC converter 11 and receive a voltage $V_{bat}$ of the battery 12 (S10). The controller 13 may be configured to determine a first control value $V_{C1}$ for compensating a voltage drop, based on a compensation voltage command $V_O*$ which is fed back or an output voltage detection value $V_O$ of the DC-DC converter 11, and the voltage $V_{bat}$ of the battery 12 (S20). Further, the controller 13 may be configured to determine second control values $V_{C21}$ and $V_{C22}$ for vehicle de-rating (S30). The controller 13 may be configured to generate the compensation voltage command $V_O*$ by applying the first control value WI and the control values $V_{C21}$ and $V_{C22}$ to the output voltage command $V_{vrv}*$ (S40).

As is apparent from the above description, the voltage drop compensation control system and method according to an exemplary embodiment of the present disclosure compensate for a voltage drop occurring between the DC-DC converter and the battery by proportionally adjusting an error between an output voltage of the DC-DC converter and a voltage of the battery. Accordingly, the DC-DC converter more efficiently outputs a voltage to enable operation of the battery in an optimal state.

Additionally, the voltage drop compensation control system and method according to an exemplary embodiment may cause the DC-DC converter to output a voltage in which voltage drop compensation is reflected even when de-rating such as a current limit of the battery and an output current limit of the DC-DC converter occurs. Accordingly, a de-rating response in comparison with a conventional control scheme may be improved. Further, when the load abruptly varies or a mode is abruptly changed, the number of times of fault occurrence and the possibility of fault caused by excessive current of the DC-DC converter may be reduced and the durability of the DC-DC converter may be improved and marketability of a product may be improved.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A voltage drop compensation control system of a power supply device, comprising:
   an electric connection line having a voltage drop between a direct current (DC)-DC converter and a battery; and
   a controller configured to generate a compensation voltage command, obtained by compensating for an output voltage command of the DC-DC converter, by applying a first control value for compensating for the voltage drop to the output voltage command,
   wherein the controller is configured to determine the first control value, based on an error between the compensation voltage command or an output voltage detection value of the DC-DC converter and a voltage of the battery, and
   wherein the controller includes a voltage command determiner configured to determine the output voltage command based on a driving condition of a vehicle.

2. The voltage drop compensation control system according to claim 1, wherein the controller is configured to generate the compensation voltage command, obtained by compensating for the output voltage command, by applying a second value for vehicle de-rating to the first control value for compensating for the voltage drop.

3. The voltage drop compensation control system according to claim 2, wherein the second control value is determined based on a current limit of the battery or an output current limit of the DC-DC converter.

4. The voltage drop compensation control system according to claim 1, wherein the controller includes:
   a proportional controller configured to proportionally adjust an error between the compensation voltage command or the output voltage detection value of the DC-DC converter and the voltage of the battery; and
   a low-pass filter configured to determine the first control value by filtering an output of the proportional controller.

5. The voltage drop compensation control system according to claim 4, wherein a proportional gain of the proportional controller is about 1.

6. The voltage drop compensation control system according to claim 4, wherein the low-pass filter is configured to determine a band when a response of voltage drop compensation based on the first control value is less than variation of the voltage of the battery.

7. A voltage drop compensation control method of a power supply device, for compensating for a voltage drop generated in an electric connection line between a direct current (DC)-DC converter and a battery, comprising:
   determining, by a controller, an output voltage command of the DC-DC converter based on a driving condition of a vehicle and receiving a voltage of the battery;
   determining, by the controller, a first control value for compensating for the voltage drop, based on a compensation voltage command which is fed back or an output voltage detection value of the DC-DC converter, and a voltage of the battery; and
   generating, by the controller, the compensation voltage command by applying the first control value to the output voltage command.

8. The voltage drop compensation control method according to claim 7, further comprising:
   determining, by the controller, a second control value for vehicle de-rating, before the generating the compensation voltage command.

9. The voltage drop compensation control method according to claim 8, wherein determining the second control value is based on a current limit of the battery or an output current limit of the DC-DC converter.

10. The voltage drop compensation control method according to claim 8, wherein generating the compensation voltage command includes:
    applying, by the controller, the second control value to a value obtained by applying the first control value to the output voltage command.

11. The voltage drop compensation control method according to claim 7, wherein the determining the first control value further comprises:
- performing, by the controller, proportional adjustment by applying a proportional gain to an error between the compensation voltage command or the output voltage detection value of the DC-DC converter and the voltage of the battery; and
- performing, by the controller, filtering for determining the first control value by low-pass filtering a value obtained by applying the proportional gain to the error.

12. The voltage drop compensation control method according to claim 11, wherein the proportional gain is about 1.

13. The voltage drop compensation control method according to claim 11, wherein the performing the filtering includes:
- applying, by the controller, low-pass filtering for determining a band such that a response of voltage drop compensation based on the first control value is less than variation of the voltage of the battery.

* * * * *